Figure 1:
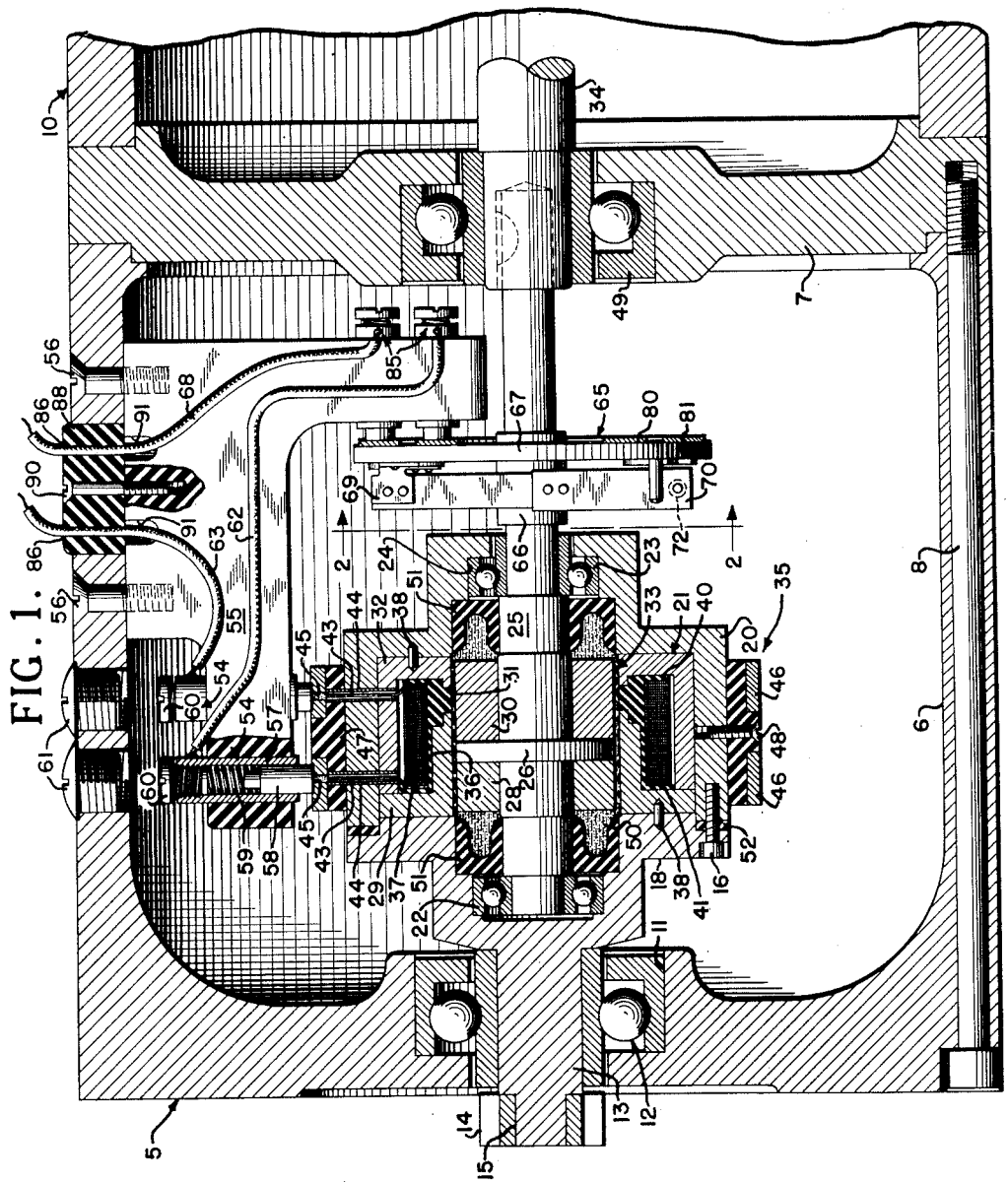

May 19, 1953 G. G. GOULD 2,639,414
CONSTANT SPEED DRIVE BY USE OF A MAGNETIC-FLUID CLUTCH
Filed Aug. 11, 1950 2 Sheets-Sheet 2

Inventor
GERALD G. GOULD

By G. D. O'Brien
R. M. Hicks Attorneys

Patented May 19, 1953

2,639,414

UNITED STATES PATENT OFFICE 2,639,414

CONSTANT SPEED DRIVE BY USE OF A MAGNETIC-FLUID CLUTCH

Gerald G. Gould, Silver Spring, Md.

Application August 11, 1950, Serial No. 178,945

3 Claims. (Cl. 322—30)

(Granted under Title 35, U. S. Code (1952), sec. 266)

This invention relates generally to torque converters and more particularly to a new and improved constant speed clutch of the electromagnetic type adapted to convert rotary motion applied thereto from a variable speed source into a constant speed output for the purpose of driving an A. C. generator, or the like, whereby under a constant electrical load the frequency output of the generator will remain constant within 1% while the speed of the driving source may vary as much as 85%.

Of the numerous types of constant speed clutches heretofore devised, that set forth in the copending application of Gerald G Gould et al. for Method and Apparatus for Adjusting a Centrifugally Responsive Clutch, Serial No. 171,486, filed June 30, 1950, has, prior to the conception of the fluid magnetic clutch of the instant device been found to give satisfactory results in maintaining the high degree of accuracy required for purposes such, for example, as driving an A. C. generator from the propeller shaft of a running torpedo.

It has been found further, however, that because of the relative rapid wear of the frictional surfaces of clutches of the centrifugally responsive types, their use has been somewhat restricted to applications of short interval operation whereas the magnetic fluid clutch of the instant device may be employed with confidence for continuous operation over much longer periods of time and within a far closer degree of its initial accuracy.

The electromagnetic constant speed clutch of the present invention provides for driving an A. C. generator, or the like, through a medium of magnetic fluid adapted when sufficiently magnetized to provide a driving connection between a variable speed source and a generator connected to be driven thereby. By the provision on the driven shaft of the clutch of a control effective to reduce the magnetization of the clutch fluid as the operating speed of the driven shaft reaches that desired for the operation of the generator driven thereby, there is produced in this manner the result of controlled clutch slippage whereby the generator speed is accurately maintained at that selected therefor while the speed of the driving source may fluctuate widely.

A further provision of the clutch of the instant device is the arrangement therein of a permanent magnet adapted to initially activate the fluid of the clutch sufficiently for producing partial operation of the generator driven thereby and from which the electromagnetic elements of the clutch are energized to increase in this manner the magnetization of the clutch fluid for maximum linkage between the driving and driven shafts of the clutch.

It is an object of the present invention to provide a new and improved constant speed electromagnetic clutch for driving an A. C. generator, or the like, from a variable speed source.

It is a further object to provide a new and improved constant speed magnetic fluid clutch wherein a permanent magnet is arranged therein to partially activate the magnetic fluid of the clutch.

A still further object is to provide a new and improved constant speed electromagnetic clutch for driving an A. C. generator, or the like, wherein the current for energizing the electromagnetic fluid of the clutch is supplied from the generator driven thereby.

A still further object is to provide a constant speed electromagnetic clutch wherein the activation of the magnetic fluid thereof is controlled from the driven shaft of the clutch.

Figure 2:
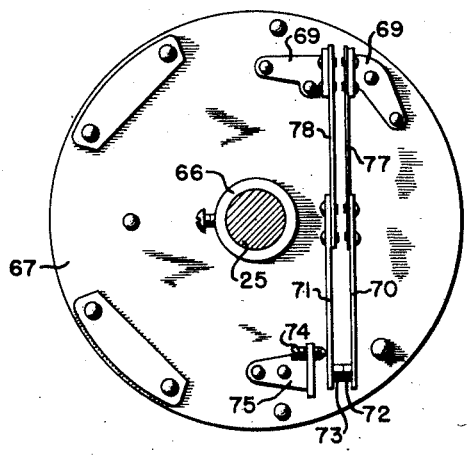
Figure 3:
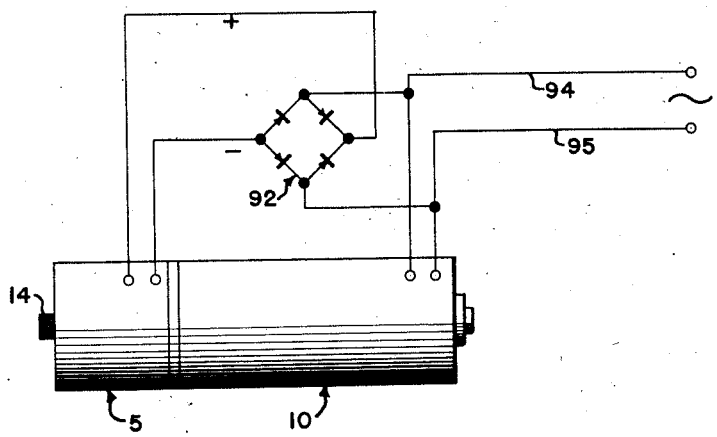

Other objects and many of the attendant advantages of this invention may be readily appreciated as the same becomes better understood by reference to the following detailed description when considered in connection with the accompanying drawings wherein:

Fig. 1 is a cross sectional view partly in elevation of the clutch of the present invention as mounted upon the forward end plate of an A. C. generator to be driven thereby;

Fig. 2 is a plan view, as seen along the line 2—2 of Fig. 1, of the centrifugally responsive switch adapted for being supported from the driven shaft of the clutch and operative to control the energization of the electromagnetic field of the clutch, the driven shaft appearing in section; and Fig. 3 is a view in elevation of the clutch of the present invention as electrically connected, by way of a full wave rectifier, with the generator driven thereby.

Referring now to the drawings and more particularly to Fig. 1 thereof the clutch of the present invention generally designated 5 is shown to include a cup-shaped housing 6 adapted, by reason of the formation of the open end portion thereof, to couple in the manner illustrated with the end plate 7 of an A. C. generator generally designated 10 and to which the clutch housing 6 is secured as by a plurality of elongated bolts 8.

Secured as by press fitting within a centrally arranged recess 11 internally formed in the closed end section of the clutch housing 6, is a ball bearing assembly generally designated 12 and wherein there is disposed for rotation with the inner race of the bearing a shaft section 13, hereinafter referred to as the driving shaft of the clutch. A gear 14 secured as by sweating to a reduced end portion of the shaft as at 15 provides means whereby there may be connected with the shaft any suitable driving source such, for example, as the propeller shaft, not shown, of an underwater torpedo, also not shown.

Secured as by screws 16 to an extending flange section 18 of the shaft 13 is the edge portion of a cup-shaped inner clutch housing 20 and wherein is mounted the electromagnetic elements of the clutch generally designated 21. A bearing assembly 22 centrally arranged within the flange 18 and adapted for cooperating with a similarly formed bearing 23 mounted, as illustrated, within an annular recess 24 provided therefor in the clutch housing 20 supports for rotation within the housing a shaft section 25, hereinafter referred to as the driven shaft of the clutch.

Provided on shaft 25 and preferably forming an integral part thereof is an extending flange 26 against which, when press fitted over the shaft to the position indicated, is an annular permanent magnet member 28 so magnetized that the poles thereof are diametrically opposed and so arranged that the flux path thereof is completed across by an annular pole piece 29 forming a part of the electromagnetic assembly 21. The shaft 25 by being formed of any suitable non-magnetic material such, for example, as stainless steel, the flange 26 thereof accordingly does not effect a magnetic short across the permanent magnet 28 arranged in abutting adjacency with the flange.

Fixedly secured to the shaft 25 and opposite the surface of the flange 26 against which rests the permanent magnet 28 is an annular sleeve 30 of highly permeable magnetic material such, for example, as soft iron, or the like, and so arranged with respect to a gap 31 formed between annular pole pieces 29 and 32 of the electromagnet assembly 21 as to provide by this sleeve a flux path around the gap 31 for a purpose which will become more apparent as the description proceeds. The elements including the driven shaft 25, the permanent magnet 28 and sleeve 30 comprise the assembly hereinafter referred to as the armature of the clutch and generally designated 33 with the shaft 25 thereof extending outwardly from the end of the housing 20 to connect in an obvious manner, as illustrated, with the generator shaft 34 to be driven thereby.

A bearing 49 along with the bearing 12 supports the inner clutch assembly 35 for free rotation within the inner clutch housing 6.

The electromagnet assembly 21 is comprised of an insulating spool 36 whereupon is wound a suitable length of wire to form the coil 37. The spool is thereafter closely fitted, in the manner illustrated, between the pole pieces 29 and 32 to be fixedly clamped therebetween as the housing 20 is drawn by screws 16 to the face of the flange 18. Suitable means are provided such, for example, as the stake pins 38 for securing the magnetic assembly 21 to the housing and flange 20 and 18 respectively whereby is thusly prevented, by this arrangement, the possibility of the electromagnet assembly changing position within the housing during subsequent operation of the clutch.

The flange 40 of the spool 36 is reduced in diameter over that of the flange 41 thereof whereby there is provided clearance for the leads 43 of the coil as the latter is fitted within the pole piece 32 during the assembly of the magnet with the leads 43 of the coil extending laterally outward therefrom through insulating sleeves 44 to connect as by soldering at 45 to a pair of slip rings 46 mounted upon and electrically insulated from each other respectively and from the housing 20 as by an insulating sleeve member 47. A suitable number of screws 48 are arranged to secure the sleeve member 47 to the inner housing as by threading therewith as illustrated.

Occupying the space between the armature 33 and the electromagnetic assembly 21 of the clutch is a quantity of magnetic fluid 50 known to those skilled in the art as oil, or the like, having therein suspended or closely spaced particles of iron powder and possessing the characteristics of changing viscosity proportional to the degree of magnetization of the iron of the fluid. A pair of suitable ring gaskets 51 interposed in the manner illustrated between the armature shaft 25 and the clutch housing and flange 20 and 18 respectively, prevents escape of the fluid from the clutch after having been filled in any suitable manner as by submerging the clutch housing 20 within a quantity of the fluid as the flange 18 is secured thereto by screws 16. An annular gasket 52 interposed between the face of the flange 18 and the clutch housing 20 provides a sealed connection therebetween and whereby there is prevented in this manner leakage of fluid from the housing at this connection.

Current for energizing the coil 37 is supplied thereto by contact with the rings 46 respectively of a pair of brush assemblies generally designated 54 mounted as by press fitting within parallel bores provided therefor in an insulating bracket 55 which is secured, as by screws 56, to the inner face of the clutch housing 6. The brush assemblies 54 are conventionally formed to include tubular guide members 57 wherein vertically movable brush elements 58 are yieldably urged into electrical contact with the surface of the slip rings 46 as by helical spring members 59 retained within the guides 57 as by cap screws 60 threaded within the ends thereof. The brushes 58 may be admitted into the guides 57 through openings provided therefor in the outer housing 6 and now shown closed as by plug screws 61. Electrical connections are made with the guides 57 by electrical leads 62 and 63 which are soldered thereto as illustrated.

Connected in series with the coil 37 is a centrifugally responsive switch assembly generally designated 65 and secured as by a set screw equipped sleeve 66 to the driven shaft 25 of the clutch. The switch includes an insulating mounting disc 67 which is secured to the sleeve 66 in any suitable manner and whereupon is arranged a pair of electrically spaced angular brackets 69, Fig. 2, secured as by riveting to a common face of the disc. Fixedly secured to the brackets is a pair of spring mounted contact members 70 and 71 respectively and having mounted thereon respectively a pair of contacts 72 and 73 initially maintained in circuit closed engagement to the switch by biasing pressure applied to the contact members from a set screw 74 threadedly mounted within an angular bracket 75 provided therefor on the insulating disc 67. The spring element 77 of the member 70 by being of less strength than the spring 78 of the member 71 allows the member 70 to be centrifugally disengaged from contact with the member 71 as the rate of rotation of the driven shaft exceeds that prescribed for the generator driven thereby. The rotation rate at which the member 70 is centrifugally lifted from contact with the member 71 is controllable by the degree of initial bias applied to the members respectively by the adjustment of the screw 74 thereagainst.

The opening of the switch 65 in the manner described in response to an increase in the speed of rotation of the driven shaft is effective to deenergize electromagnet 21 of the clutch whereby the magnetization of the fluid 50 of the clutch is thusly reduced to permit clutch slippage therethrough sufficiently to reduce the speed of the driven shaft 25.

A pair of slip rings 80 and 81 suitably secured to the opposite side of disc 67 from the switch members 70 and 71 and connected respectively thereto by means of the rivets for brackets 69 provide means whereby the electrical connection is continuously maintained with the respective switch members during rotation of the disc 67 by engagement with the rings respectively of a pair of brush contact assemblies 85 which are similar to the brushes 54 and secured in a similar manner to a depending portion of the insulating bracket 55.

The arrangement of the switch 65 in the circuit of a coil 37 and including leads 62, 63 and and 68 provides means whereby current flow to the coil is interrupted at the switch when the rate of rotation of the shaft 25 reaches that prescribed for the operation of the generator 10 driven thereby.

The leads 63 and 68 connected to the brush assemblies 54 and 85 respectively extend from the outer clutch housing 6 through openings 86 provided therefor in an insulating block member 88 inset within an opening in the clutch housing and secured, as by a screw 90, to the insulating bracket 55. Angular grooves 91 provided for the leads in the surface of the bracket 55 permit the leads 63 and 68 to be received within the openings 86 in the block and through which they extend for connecting, by way of a full wave rectifier assembly 92, Fig. 3, with the generator leads 94 and 95 respectively.

Referring now briefly to the operation of the clutch thus far described the provision on the armature of the clutch of the permanent magnet 28 provides for magnetically activating initially the fluid of the clutch by completing therethrough a flux linkage from the poles of this magnet with the pole piece 29 of the electromagnet 21 whereby there is produced in this manner sufficient coupling through the fluid of the clutch to operate the A. C. generator driven thereby at current producing speed.

Current when so produced by the A. C. generator and applied by way of the rectifier and switch 92 and 65 respectively to the coil 37 of the electromagnet 21 of the clutch sets up magnetic flux in the magnetic circuit which may be traced from the annular pole piece 29 to the soft iron sleeve 30 through the magnetic fluid in the gap therebetween, thence from the sleeve to the annular pole piece 32 through the magnetic fluid in the gap therebetween, and thence back to pole piece 29 which is arranged in registered engagement with pole piece 32. Thus, the magnetic fluid is additionally magnetized by the flux in the aforetraced magnetic circuit to maximum value whereupon the coupling across the clutch is increased to that required to operate the generator 10 at the desired frequency output.

The controlling of the speed of the generator for the purpose indicated is accomplished, as heretofore described, by the adjustment of the set screw 74 that operates to apply to the contact members 70 and 71 of the switch 65 the required initial bias whereby as the speed of the driven shaft 25 of the clutch reaches that desired thereof, the member 70 of the switch is centrifugally separated from contact with the member 71 whereby current from the generator to the magnet 21 is thusly interrupted.

Upon the deenergizing of the coil 37 of the electromagnet 21, the magnetization of the fluid 50 is thusly lessened sufficiently to cause slippage through the clutch and accordingly the speed of the driven shaft thereof is reduced whereupon the member 70 of the centrifugally responsive switch 65 may again resume its contacting position with the member 71 to complete again the energization of the coil 37 and accordingly the maximum magnetic linkage through the clutch.

The intermittent operation of the electromagnet in the above described manner controls the speed of the driven shaft of the clutch, and, accordingly, such apparatus as may be connected therewith.

Obviously many other modifications and variations of the present invention are possible in the light of the above teachings. For example, whereas the permanent magnet has been disclosed as a satisfactory means for setting up an initial driving connection between the drive and driven shafts, it will be understood that other suitable means may be employed for this purpose such, for example, as a centrifugal friction clutch which is controllable by the driven shaft and arranged to be dis-engaged when the speed of the driven shaft has increased sufficiently to supply current to the electromagnet. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed as new and desired to be secured by Letters Patent of the United States is:

1. A constant speed magnetic fluid clutch of the character disclosed including, in combination, a driving shaft, a driven shaft arranged in closely spaced adjacency from said driving shaft, a quantity of magnetic fluid interposed between said shafts for providing a driving connection between said shafts as said fluid is magnetically activated, a permanent magnet carried by one of said shafts for initially activating said fluid, an electromagnet carried by the other of said shafts for additionally magnetically activating said fluid as the electromagnet is energized, a generator driven by said driven shaft and operatively connected to said electromagnet for energizing said electromagnet, a switch secured to said driven shaft and interposed between said electromagnet and said generator, and a pair of normally closed contacts on said switch and selectively actuated in response to centrifugal force for intermittently interrupting the energizing of said electromagnet.

2. A constant speed clutch of the character disclosed including, in combination, a housing, a driving shaft arranged for rotation within said housing, an annular electromagnet assembly disposed within said housing for rotation by said driving shaft, a driven shaft arranged in axial alignment with said driving shaft and rotatable independently with respect to said electromagnetic assembly, a quantity of magnetic fluid interposed between said electromagnet and said driven shaft for providing a driving connection therebetween as said fluid is magnetically activated, a permanent magnet carried by said driven shaft for initially activating said magnetic fluid, a centrifugally operated switch on said driven shaft and having a pair of contacts adapted to open in response only to a predetermined speed of rotation of said driven shaft, and a generator driven by said driven shaft and operatively connected for energizing said electromagnetic assembly as the switch is actuated from a closed position to an open position.

3. Apparatus of the character disclosed comprising, in combination, rotary means for generating alternating current, a clutch shaft for driving said rotary means, a centrifugally operated switch carried by said clutch shaft, a pair of normally closed contacts on said switch for movement to an open position in response to centrifugal force only when the speed of rotation of the clutch shaft increases to a predetermined value, an armature carried by said shaft, said armature including a magnetically permeable ring and a ring shaped permanent magnet having diametrically opposed poles sleeved on said shaft in mutually spaced relation thereon, a drive shaft arranged in axial alignment with said clutch shaft, a housing carried by said drive shaft for rotation therewith and arranged thereon to enclose said armature, means in said housing for rotatively supporting said clutch shaft concentrically therewithin, first and second annular pole pieces carried by said housing in radially spaced relation with respect to said permanent magnet and said magnetically permeable ring, the first annular pole piece and said magnet having a first circumferential gap therebetween, the first pole piece and said permeable ring having a second circumferential gap therebetween, the second pole piece and the permeable ring having a third circumferential gap therebetween, said first pole piece completing a magnetic circuit for said magnet through said first gap, said pole pieces being constructed and arranged to form a unitary hollow toroid having an annular gap intermediate said second and third gaps, a coil of wire disposed within said hollow toroid concentrically therewith, said pole pieces completing a magnetic circuit for said permeable ring through said second and third gaps, a quantity of a magnetizable fluid disposed within said housing so as to fill said first, second and third gaps, means for sealing said fluid within the housing, means for converting said alternating current to direct current, and means for energizing said coil with said direct current intermittently as the normally closed contacts are actuated selectively from a closed position to said open position.

GERALD G. GOULD.

References Cited in the file of this patent

UNITED STATES PATENTS

| Number    | Name     | Date           |
|-----------|----------|----------------|
| 704,574   | Pintsch  | July 15, 1902  |
| 1,303,484 | Davies   | May 13, 1919   |
| 1,868,910 | Miller   | July 26, 1932  |
| 2,353,107 | Winther  | July 4, 1944   |
| 2,490,554 | Snyder   | Dec. 6, 1949   |
| 2,525,579 | Beatty   | Oct. 10, 1950  |
| 2,528,316 | Mayo     | Oct. 31, 1950  |

FOREIGN PATENTS

| Number  | Country  | Date          |
|---------|----------|---------------|
| 783,426 | Belgium  | Nov. 13, 1948 |